United States Patent [19]

Kano et al.

[11] Patent Number: 4,985,788
[45] Date of Patent: Jan. 15, 1991

[54] RECORDING AND REPRODUCING APPARATUS

[75] Inventors: Kiyoshi Kano; Nobuyuki Kaku, both of Yokohama; Tatsuya Shigemura; Yoshiyuki Tanaka, both of Katsuta; Yoshihiro Fukagawa, Yokohama; Masaki Uesugi, Katsuta, all of Japan

[73] Assignees: Hitachi Video Engineering Inc., Kanagawa; Hitachi, Ltd., Tokyo, both of Japan

[21] Appl. No.: 259,324

[22] Filed: Oct. 18, 1988

[30] Foreign Application Priority Data

| Oct. 21, 1987 | [JP] | Japan | 62-263824 |
| Oct. 21, 1987 | [JP] | Japan | 62-263823 |
| Nov. 27, 1987 | [JP] | Japan | 62-297578 |

[51] Int. Cl.[5] .................................... G11B 15/66
[52] U.S. Cl. ........................................ 360/85
[58] Field of Search ....................... 360/85, 84, 95

[56] References Cited

U.S. PATENT DOCUMENTS

| 4,692,823 | 9/1987 | Gwon | 360/85 |
| 4,697,214 | 9/1987 | Sasakawa | 360/130.23 X |
| 4,704,644 | 11/1987 | Takenouchi | 360/85 |
| 4,748,521 | 5/1988 | Osawa et al. | 360/85 |
| 4,777,546 | 10/1988 | Nagasawa | 360/85 |
| 4,796,115 | 1/1989 | Ohshima et al. | 360/95 X |
| 4,866,549 | 9/1989 | Terayama et al. | 360/85 |
| 4,873,591 | 10/1989 | Kimura et al. | 360/85 |
| 4,928,191 | 5/1990 | Kaku et al. | 360/85 |

FOREIGN PATENT DOCUMENTS

| 0198512 | 10/1986 | European Pat. Off. |
| 57-33558 | 8/1982 | Japan |
| 58-60450 | 4/1983 | Japan |
| 58-218066 | 12/1983 | Japan |
| 61-242365 | 10/1986 | Japan |
| 2087629 | 5/1982 | United Kingdom | 360/85 |

Primary Examiner—John H. Wolff
Attorney, Agent, or Firm—Antonelli, Terry, Stout & Kraus

[57] ABSTRACT

An arc cam member has a guide groove formed on its underside along its arced length. On its outer circumference, the cam member is provided with a first cam portion. A second cam portion is formed in the wall of the guide groove of the cam member. The ends of a first arm and a second arm are placed in contact with the first and second cam portions respectively. As the cam member is rotated, the first and second arms move, following the shapes of the first and second cam portions. The motion of the first and second arms is used to operate the recording and reproducing apparatus.

8 Claims, 14 Drawing Sheets

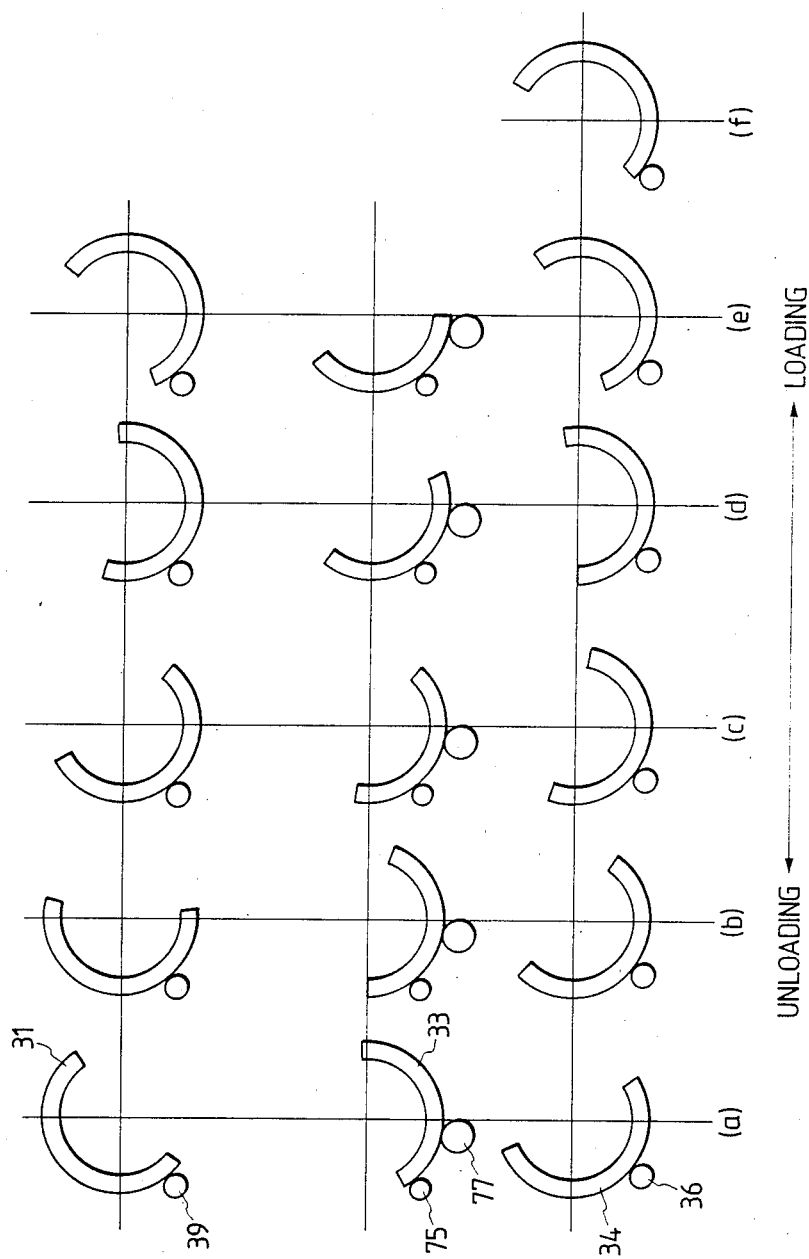

RECORDING AND REPRODUCING APPARATUS

BACKGROUND OF THE INVENTION

This invention relates to the mechanism of a recording and reproducing apparatus and more particularly to a mechanism suitable for reducing the size and weight of the apparatus and for simplifying the apparatus structure.

Conventional recording and reproducing apparatuses employ the following mechanisms as detailed in (1), (2) and (3) below.

(1) A cam mechanism is a mechanism for changing the direction and amount of motion and is used in a variety of recording and reproducing apparatuses. In a video tape recorder, for example, various kinds of cam mechanisms are employed to perform operations such as (a) application and release of a brake, (b) engagement and disengagement of a pinch roller, and (c) operation of a tension control arm. These operations are required by a mode switching between such modes as (1) fast feeding/fast rewinding, (2) stopping, (3) recording/replaying and (4) reverse replaying.

One such example is a cam disclosed in the Japanese Patent Application Laid-Open No. 58-60450 in which a cam member has a guiding portion or a slider extending in the direction of the cam movement.

A mode selection mechanism using a ring-shaped cam member is disclosed by the Japanese Patent Application Laid-Open No. 61-242364, the corresponding U.S. Pat. No. 4,748,521 and the corresponding European Patent Application Publication No. 0 198 512.

(2) Recording and reproducing apparatuses such as video tape recorders use a tape loading mechanism that drives and guides a pair of tape guides around a rotating drum to wind a magnetic tape (or simply referred to as tape) contained in a tape cassette around the drum a specified angle. One such mechanism is described in the Japanese Patent Application Laid-Open No. 58-218066. This mechanism consists of two moving rings (first and second rings) that move around the rotating drum to drive a pair of tape guides (first and second tape guides), and a drive ring to drive the first and second moving rings, these three rings being concentrically and rotatably stacked one upon the other. A similar mechanisms is also known which employs arc sliders instead of rings In such tape loading mechanisms, the rotating ring or arc slider is held and supported, on its outer or inner circumference, by gears that engage with a gear formed on the ring or arc slider and by a roller.

(3) Recording and reproducing apparatus such as video tape recorders have a tape loading mechanism which draws out the tape from a tape cassette by means of a tape guide moving along a guide path and winds the tape around the rotating drum a specified angle. Guiding the tape guide along a guide path is accomplished by a mechanism described in the Japanese Patent Application Laid-Open No. 57-133558, which consists of a T-shaped rail (guiding member) and a tape guide with a C-shaped clamp portion that clamps the rail. The tape guide is required to move along a complicated path performing a combination of such motions as straight line advance, turning and diagonal movement while avoiding interference with the tape guide and associated parts (e.g., stationary head, height restriction guide and rotating drum) mounted on a chassis. Conventional apparatuses provide a large clearance between the rail and the tape guide to allow for complicated movement of the tape guide and the play resulting from the large clearance is offset by a spring.

The above three conventional techniques (1), (2) and (3) have the following problems (1), (2) and (3), respectively.

(1) In the cam mechanism of the above technique (1), when a plurality of mechanism elements have different patterns of motion, it is necessary to provide cams each dedicated to each element. To meet this requirement, the following three methods have commonly been practiced.

(a) The cam member is elongated in a longitudinal direction to connect cams in series.
(b) The width of the cam member is increased and cams are provided on each side of the cam member; or a plurality of cam patterns are arranged parallelly in the direction of width.
(c) The thickness of the cam member is increased and a plurality of cam patterns are arranged in layers in the direction of thickness.

In any of the above methods, the problem is that the cam member necessarily becomes large, which in turn increases the size of the cam mechanism and therefore the apparatus as a whole.

(2) As to the conventional technique of item (2), no consideration is taken regarding the play of arc slider and the engagement of gear during the process of holding the arc slider. Let us consider the case of an arc slider with a gear formed along the outer circumference. To hold and support the arc slider requires at least three members—a first gear for driving the arc slider, a second gear for supporting the outer circumference of the arc slider, and a roller located between the two gears for receiving the inner circumference of the arc slider. However, as these members rotate through large angles, there are states where the arc slider and gears are not in mesh. When in this condition it is attempted to bring the arc slider and the gears into mesh, the arc slider may fail to come into smooth meshing engagement with the gears because of the deflection of the slider and because of the plays and backlash between the gear supporting the outer circumference of the slider and the gear portion on the slider, resulting in the arc slider halting during operation. To solve this problem, it is necessary to use three or more gears and rollers and also provide a special mechanism or device to eliminate improper engagement of gears, which in turn increases the number of parts used and therefore the space to accommodate them.

(3) The conventional technique of item (3) requires a spring to offset the clearance between the rail and the tape guide. This gives rise to problems such as difficulty in forming the tape guide in a desired shape and in reducing the size of the mechanism as a whole It also increases the number of parts. Moreover, since the tape guide is simply held on the rail by a spring, the posture of the tape guide is difficult to maintain during loading, raising the possibility of the tape being damaged.

SUMMARY OF THE INVENTION

An object of this invention is to solve the abovementioned three problems That is, an object of the invention is to provide:

(1) a cam mechanism which is small and can handle a plurality of mechanism elements with different motion patterns;

(2) a tape loading mechanism which stably rotates a plurality of concentrically stacked arc sliders using a small number of parts and a small parts accommodating space, without producing improper engagement of gears; and (3) a tape loading mechanism in which while no spring is used for engagement between a rail and a tape guide, the tape guide always clamps the rail stably; thereby making the construction of the recording and reproducing apparatus small, lightweight and simple.

The first item (1) of the above objective can be achieved by this invention which provides a cam mechanism that comprises: a cam member including a first cam portion formed on its outer circumference, a guiding portion formed in the cam member along the direction of its movement, and a second cam portion formed on the guiding portion; a first element in contact with the first cam portion, the first element being moved to follow the shape of the first cam portion; and a second element in contact with the second cam portion, the second element being moved to follow the shape of the second cam portion.

Since the cam portion is provided in the guiding portion of the cam member, that portion of the thickness or width of the cam member which is around a guiding portion and which has so far been a dead space, can now be effectively used for forming a cam stepped recess, making it possible to increase the number of cam patterns without increasing the size of the cam member.

According to one embodiment of this invention, this guiding portion is a groove formed in the cam member along the direction of motion of the cam member. The second cam portion is formed in the wall of the groove.

The second item (2) of the above objective can be achieved by this invention which provides a tape loading mechanism which comprises: first and second sliding members having guide grooves formed therein so that they can move along the outer circumference of a rotating drum which is rotatably supported on a chassis; a tape guiding means provided at one end of the second sliding member; a first guiding member mounted on the chassis, the first guiding member engaging with the groove of the first sliding member to slidably hold and guide the first sliding member; and a second guiding member mounted on the first sliding member, the second guiding member engaging with the groove of the second sliding member to slidably hold and guide the second sliding member.

The first sliding member is held by the first guiding member mounted on the chassis while the second sliding member is held by the second guiding member mounted on the first sliding member. This construction reduces the relative displacement in position between the first add second sliding members, which in turn results in a good meshing condition of the gears.

The third item (3) of the above objective can be achieved by this invention which provides a tape loading mechanism that comprises a guiding member provided around a rotating drum, the guiding member having a plurality of arc portions with different curvatures; and a tape guiding means having a clamping portion to clamp the guiding member in such a way that the tape guiding means can move along the guiding member, the clamping portion having a plurality of projections on a surface contacting the guiding member, the projections being formed to have an arcuate cross section.

Whether the guiding member is straight or curved, the guiding member and the arc projections are always in contact or engagement with each other with an almost constant and small clearance therebetween. Such an engagement or contact assures that the tape guiding means is stably supported and guided by the guiding member.

BRIEF DESCRIPTION OF THE DRAWINGS

FIG. 16 is a model diagram showing the rotating phase of the two drive members and the cam member;

DETAILED DESCRIPTION OF THE PREFERRED EMBODIMENTS

One embodiment of the invention will now be described by referring to the attached drawings.

Figure 1:
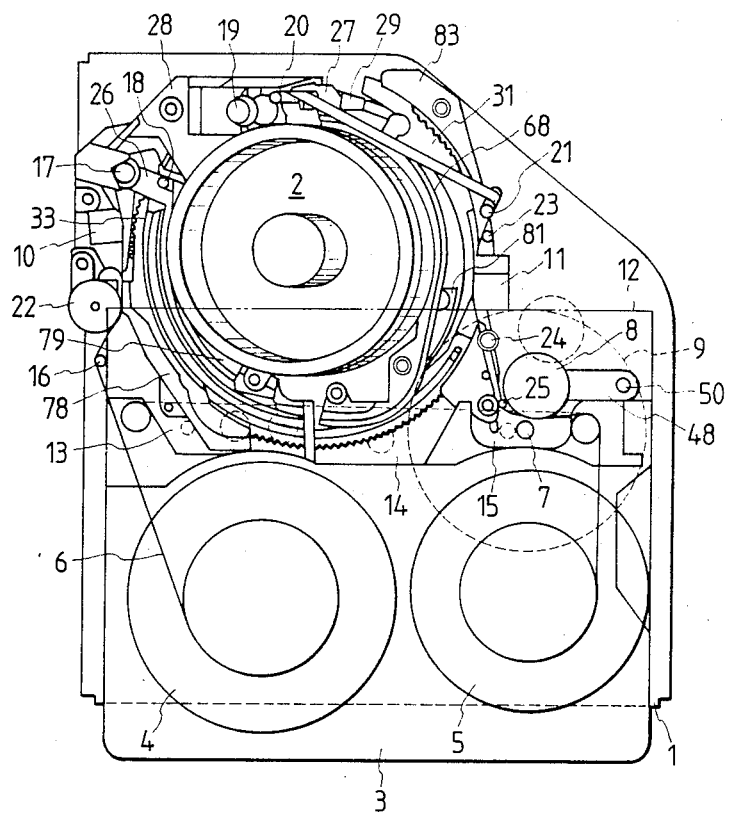
FIG. 1 is a plan view of the recording and reproducing apparatus as one embodiment of the invention.

FIG. 1 is a plan view of the video magnetic recording and reproducing apparatus using the cam mechanism and tape loading mechanism of this invention. In the figure, reference numeral 1 denotes a chassis, 2 a tape guiding drum on which a magnetic head is mounted, 3 a cassette containing a tape 6, the tape being wound on a supply reel 4 and a take-up reel 5, 7 a capstan directly connected at the lower end to a motor 9, 8 a pinch roller, 10 an erase head that erases recorded information over the entire width of the tape 6, and 11 an audio head and control head to record or reproduce audio signals and control signals at the upper and lower edges of the tape 6. When the cassette 3 is loaded in the apparatus, a cover 12 at the front of the cassette 3 opens. Into an opening 13 are inserted a tension pin 16, a guide roller 17 and an inclined pin 18; into an opening 14 are inserted a guide roller 19 and an inclined pin 20; and into an opening 15 are inserted an inclined pin 21 and the capstan 7. They are inserted to the positions indicated by broken lines and solid lines. At this time the pinch roller 8 is at the position indicated by a broken line. During the loading operation, each guide moves while drawing out the tape 6. The guide roller 17 and the inclined pin 18 move together horizontally to be positioned near the tape guiding drum 2. The guide roller 19 and the inclined pin 20 are moved together horizontally until they come near the audio head and control head 11 and thereafter moved downwardly slantwise to be positioned near the tape guiding drum 2 where they wind the tape 6 around the drum 2 an angle of about 270°. The inclined pin 21 is moved horizontally from behind the inclined pin 20 and fixed at the tape entrance side of the audio head and control head 11 to adjust the posture of the tape 6 and lead it to the take-up reel 5. As a result, the tape 6 is drawn from the cassette 3 passing through the tension pin 16, an impedance roller 22, erase head 10, guide roller 17 and inclined pin 18 and wound spirally around the tape guiding drum 2 a specified angle. The tape 6 is further led through the guide roller 19, inclined pin 20, inclined pin 21, a stationary guide 23, audio head and control head 11, a height restriction guide 24 and a stationary guide 25 and then pressed between and fed by the capstan 7 and the pinch roller 8 to the take-up reel 5.

Figure 2A:
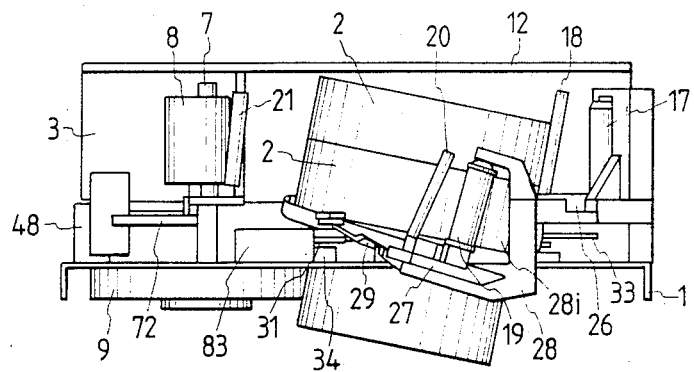
FIGS. 2(a) and 2(b) are side views showing the apparatus of FIG. 1 in a tape-loaded condition and in a tape-unloaded condition, respectively.
Figure 2B:
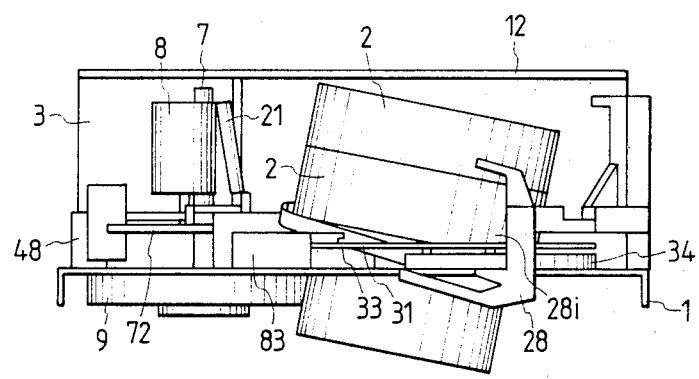

FIG. 2(a) is a side view of the apparatus upon completion of loading and FIG. 2(b) shows a side view at completion of unloading. In FIG. 2(a), the guide roller 17 and the inclined pin 18 are securely mounted on a guide base 26 which is held in position by a catcher 28. Another guide base 27 also has the guide roller 19 and the inclined pin 20 securely mounted thereon and is held in position by the catcher 28. The tape guide on the tape exit side of the tape guiding drum 2 is, as shown, set lower than the tape guide on the tape entrance side as much as the width of the tape. This arrangement reduces the inclination angle of the tape guiding drum 2. Also the tape guide on the exit side is set slightly lower than the cassette 3 to allow the tape guiding drum 2 to be located below the cover 12 that opens in front of the cassette 3, thereby reducing the size and thickness of the apparatus.

Figure 3:
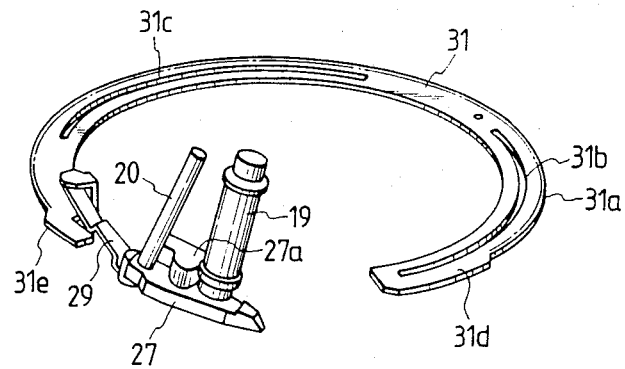
FIG. 3 is a perspective view showing a guide moving member on the tape leaving side or tape exit side.

Now, we will explain the loading mechanism in detail. FIG. 3 shows a guide moving member on the tape exit side. The guide base 27 with the guide roller 19 and the inclined pin 20 secured thereto is, as shown, connected to a connector plate 29 with a large play therebetween. The connector plate 29 is in turn supported, with a large play therebetween, by one end of a drive member 31 on the tape exit side. The drive member 31 on the tape exit side is arc-shaped and has a gear portion 31a formed on its outer circumference.

Figure 4:
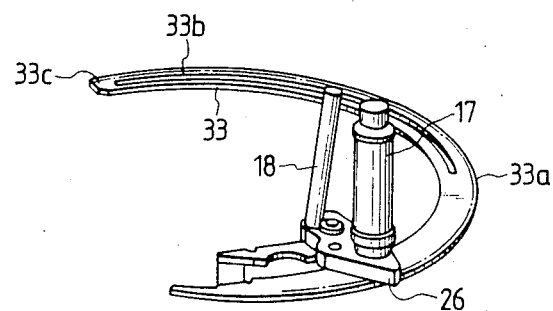
FIG. 4 is a perspective view showing a guide moving member on the tape approaching side or tape entrance side.

FIG. 4 shows a guide moving member on the tape entrance side. A guide base 26 which has the guide roller 17 and the inclined pin 18 securely mounted thereon is supported by one end of the drive member 33 on the tape entrance side so that the guide base 26 is rotatable in a plane. The drive member 33 on the tape entrance side is also arc-shaped and has a gear portion 33a formed on its outer circumference.

Figure 5:
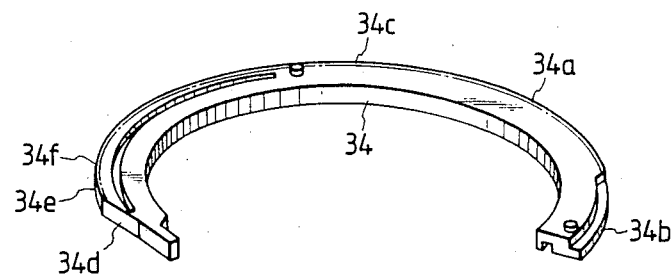
FIG. 5 is a perspective view of a cam member.

FIG. 5 shows a cam member 34. The cam member 34, which is arc-shaped as a whole consists of two stages: The upper stage has a gear portion 34a a cam 34d, counterclockwise; the lower stage has a stopper surface 34b to cooperate with a Geneva gear (described later), a cam 34c for mode switching after loading, a cam 34f used during loading or unloading, and a cam 34e for mode switching after unloading. The drive member 33 on the tape entrance side, the drive member 31 on the tape exit side and the cam member 34 are stacked concentrically on the chassis in that order with drive member 33 as the top.

Figure 6:
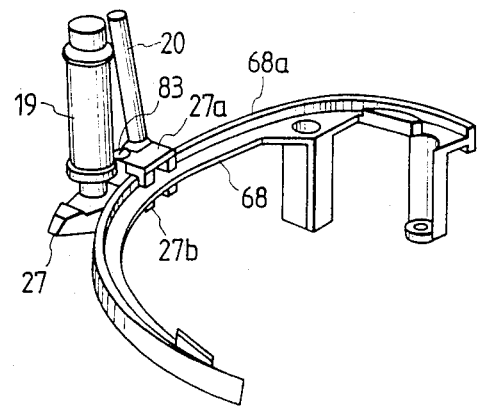
FIGS. 6 and 7 are perspective views showing a guide member and a partly sectioned guide member, respectively.

FIG. 6 is a perspective view of a guide member 68 for a group of tape guides, showing how the guide base 27 on the tape exit side is supported on the guide member 68. The guide member 68 is T-shaped in cross section. Clamp portions 27a, 27b of the guide base 27 are formed like a letter C in cross section. The clamp portions 27a, 27b engage the guide member 68 by clamping the T-shaped portion to restrict the path of the guide base 27.

Figure 7:
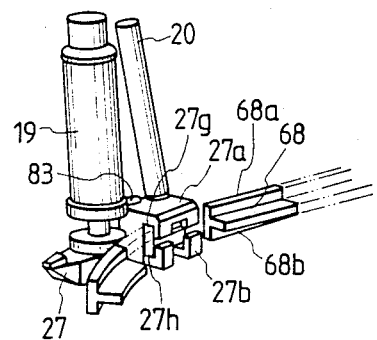
Figure 8A:
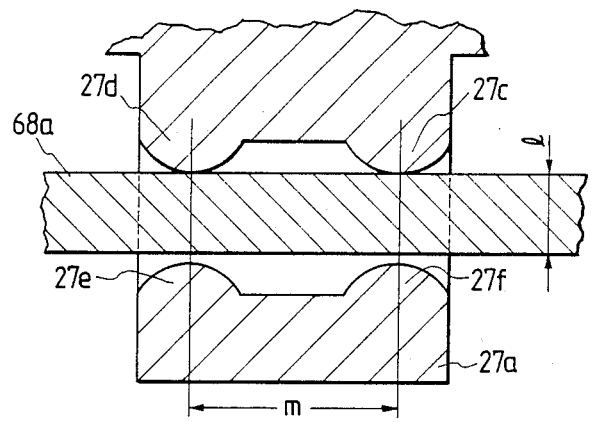
FIGS. 8(a) and 8(b) are vertical cross-sectional views showing a combination of the straight portion of the guide member and a guide base and a combination of the curved portion of the guide member and a guide base, respectively.
Figure 8B:
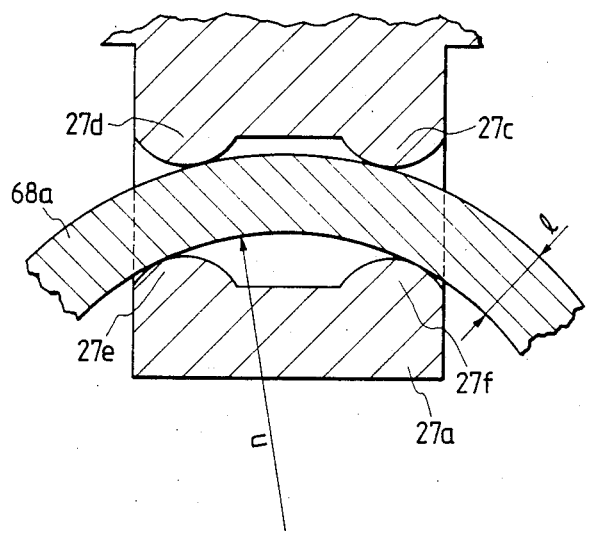

FIG. 7 shows the cross section of the T-shaped guide member 68 and the guide base 27. The upper clamp portion 27a has four arc-shaped projections 27c to 27f that engage with the upper projection 68a of the guide member 68. The same construction is used on the lower clamp portion 27b of the guide base 27. The guide member 68 is clamped at four locations, two at the right and two at the left. With respect to the vertical direction, the top and bottom 68a, 68b of the guide member 68 are held the clamp portions 27g, 27h of the guide base 27. The engagement surfaces of the guide base 27 with the guide member 68 are formed in an arc as shown in FIG. 8(a) and 8(b) to keep the guide member 68 and the guide base 27 in contact while retaining an almost constant small clearance between the guide member 68 and the arc projections 27c to 27f of the guide base 27, whether the guide member 68 is straight as shown in FIG. 8(a) or curved in FIG. 8(b). This enables the guide base 27 to be held stably. The radius of the arc projections is determined by the width l of the guide member 68, the span m between the arc projections and the minimum radius n of the guide member 68.

While this embodiment shows the guide member 68 supported at four locations, it may be supported at three locations.

Next, we will describe the cam mechanism of this embodiment.

Figure 9A:
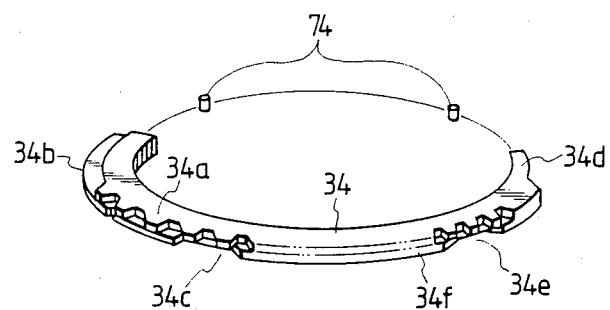
FIGS. 9(a) and 9(b) are perspective views showing the top side and the bottom side of the cam member, respectively.
Figure 9B:
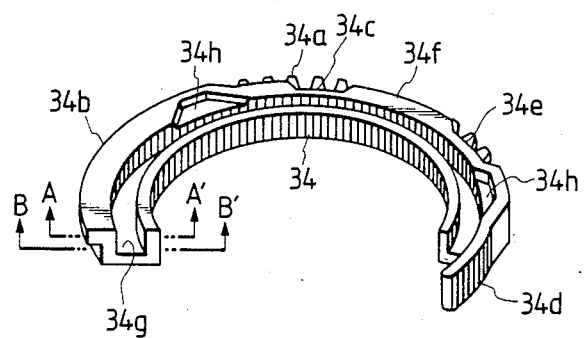

First, let us turn to the cam member 34. FIG. 9(a) shows the overall view of the cam member 34 as seen from above. The structure of the cam member 34 is already described in the foregoing. The bottom side of the cam member 34 is shown in FIG. 9(b). On the bottom side, the cam member 34 has an engagement groove 34g with which guide pins 74 erected on the chassis 1 engage.

Recesses are cut from the engagement groove 34g into the outer side wall of the groove 34g to form in-groove cams 34h at two locations. The in-groove cams 34h are formed shallower than the engagement groove 34g. (This is detailed in FIG. 12).

Figure 10A:
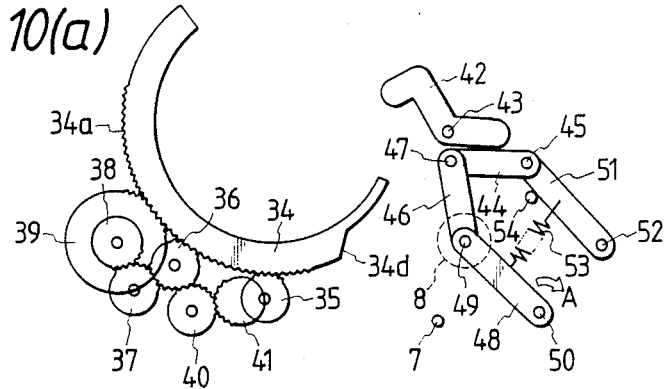
FIGS. 10(a), 10(b) and 10(c) are plan views of a pinch roller pressing mechanism showing the sequence of conditions from the unloading to the loading state and showing a cross-sectional view of cam member 34 taken along the line B—B' of FIG. 9(b)
Figure 10B:
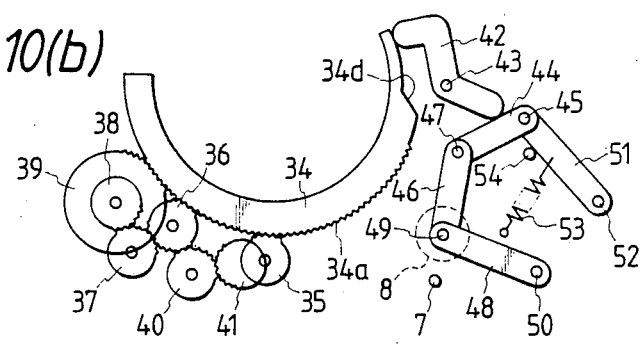
Figure 10C:
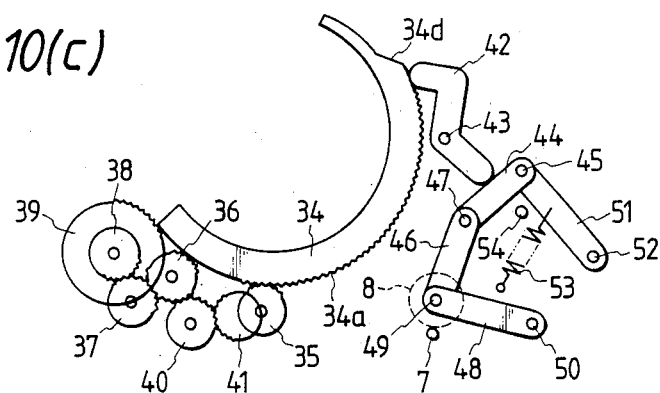

FIG. 10(a), 10(b), 10(c) show a cross section of the cam member taken along the line B—B' of FIG. 9(b) and its drive system. FIG. 10(a) represents the condition in which the tape is unloaded; FIG. 10(b) shows the mechanism during the process of loading or unloading; FIG. 10(c) shows the condition where the tape is loaded. The cam member 34 is driven by a gear 35 which in turn is driven by a drive source (not shown) and which engages with the gear portion 34a of the cam member 34. As the cam member 34 rotates, a gear 36 in mesh with the gear portion 34a is also rotated. The rotation of the gear 36 is transmitted through gears 37, 38 and 39 to the drive member 31 on the tape exit side. The gears 38 and 39 are made to rotate together by a pressing spring (not shown) and the gear 39 engages with the gear portion 31a of the drive member 31. Likewise, on the tape entrance side the drive member 33 is driven by the gear 36 through gears 40, 41 and 77. The gear 77 has a built-in pressing spring (not shown) and engages with the member portion 33a of the drive gear 33 on the tape entrance side.

In the state of FIG. 10(c) where the loading is completed, the gear 36 is stopped by the Geneva gear (described later) and disengaged from the gear portion 34a. In the state of FIG. 10(b) during the process of loading, the front end of the cam member 34 engages with an arm 42 which is pivoted about a shaft 43 causing an arm 44 to rotate about a shaft 45. The arm 44 is linked to an arm 48 and a shaft 49 through an arm 46 and a shaft 47 so that the pivoting arm 44 causes the pinch roller 8 which is rotatably supported on the arm 48 to move to the loading position. Since the arm 48 is urged by a spring (not shown) toward the arrow A, the pinch roller 8 is retracted to the unload position when the cam member 34 and the arm 42 are not engaged, as shown in FIG. 10(a) As the cam member 34 is further rotated from the condition of FIG. 10(b) to the condition of FIG. 10(c), the arm 42 engages with the cam 34d and the toggle mechanism made up of the arms 44 and 46 presses the pinch roller 8 against the capstan 7. The shaft 45 is securely attached to an arm 51 which is rotatably supported on a shaft 52 The arm 51 is always pulled by a spring 53 and held against a stopper 54. As the arm 42 is further rotated after the movement of the pinch roller 8 is stopped, the arm 51 parts from the stopper 54 against the force of the spring 53, thus providing the pinch roller 8 with a sufficient pressing force against the capstan 7.

Figure 11B:
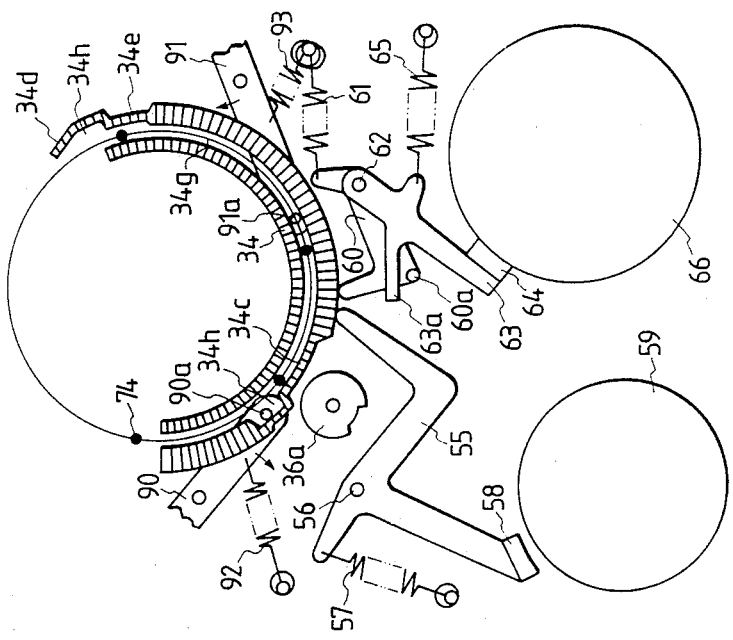
FIGS. 11(a), 11(b) and 11(c) are plan views showing a cross-sectional view of cam member 34 taken along the line A—A' of FIG. 9(b) and showing the operation of the lower stage of the cam member from the unloaded state to the loaded state.
Figure 11A:
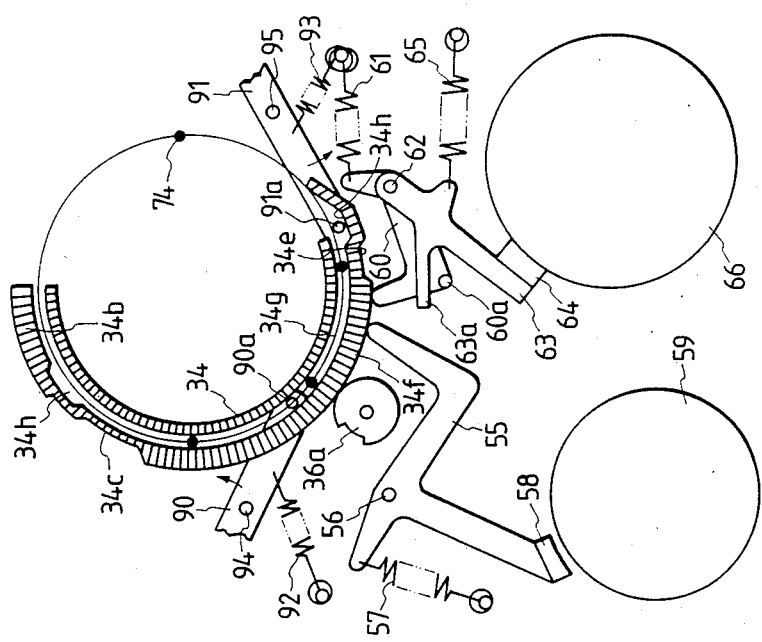
Figure 11C:
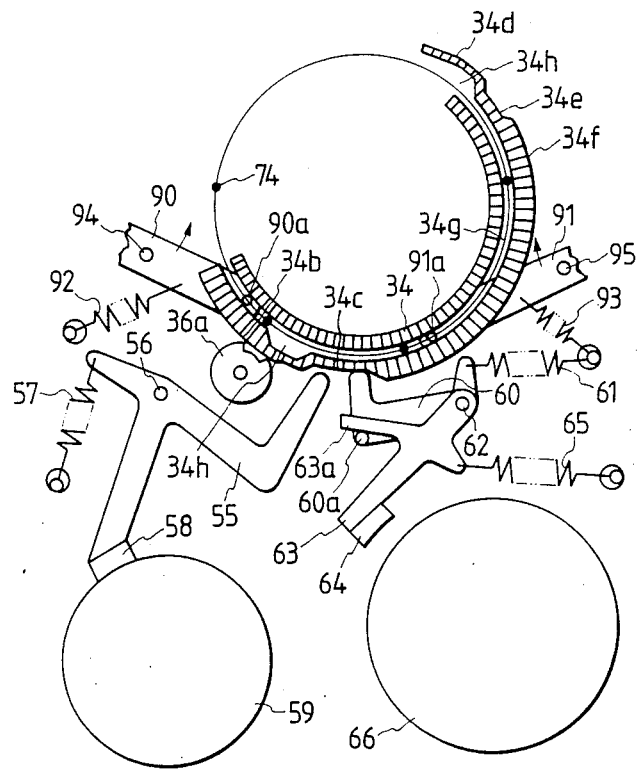

FIGS. 11(a), (b), (c) show the cross section of the cam member 34 taken along the line A—A' of FIG. 9(b) and the mode selection mechanism, with FIG. 11(a) representing the unloaded state, FIG. 11(b) representing the loading or unloading state, and FIG. 11(c) representing the loaded state. Reference numeral 36a denotes a Geneva gear portion integrally formed with the gear 36. First, we will explain arms (mechanism elements) 55, 60 that engage the outer circumference of the cam member 34. The arm 55 engages at one end with the cam 34c and is urged counterclockwise about a shaft 56 by a spring 57 attached to the other end of the arm 55. The latter end of the arm 55 is fitted with a brake member 58 that applies a braking force to the supply reel table 59. The arm 60 engages with the cam 34c and is urged clockwise about a shaft 62 by a spring 61 attached to one end of the arm 60. An arm 63 has a branch arm 63a that is engageable with a shaft 60a on the arm 60. The arm 63 is also attached at one end with a spring 65 that urges the arm 63 counterclockwise about a shaft 62. The other end of the arm 63 is fitted with a brake member 64 that applies a braking force to a drive disk 66.

FIG. 11(a) shows the halted condition of the mechanism after the tape is unloaded, in which the arm 55 is engaged with the cam 34f and the brake on the supply reel table 59 is released. The arm 60, on the other hand, is engaged with the cam 34f so that it disengages the shaft 60a from the branch arm 63a against the force of the spring 61. This in turn applies braking to the drive disk 66 by the action of the spring 65. The magnitude of this braking force does not depend on the stroke of the cam 34f but is constant and provided by the force of the spring 65.

In the condition of FIG. 11(b), the arm 55 and 60 engage with the cam 34f, with the brake on the supply reel table 59 released Thus, during loading the tape 6 is fed from the supply reel side.

FIG. 11(c) shows the recording and reproducing condition. In this condition the end of the arm 55 falls into the recess or cam 34c, applying the brake to the supply reel table 59. Since the arm 55 is not in direct contact with the cam 34c, the magnitude of the braking force is determined only by the force of the spring 57, and is independent of the stroke of the cam 34c, so that it is stable. The arm 60 is turned by the spring 61 and engages with the cam 34c, so that the shaft 60a engages with the branch arm 63a, turning the arm 63 against the force of the spring 65 and releasing the brake from the drive disk 66. At this time the Geneva gear portion 36a engages with the stopper surface 34b, stopping the rotation of the gear 36 and therefore the drive members 31 and 33. At the same time, the pressing force on the positioning member for each group of tape guides is maintained. Since the motion of the cam member 34 is transmitted to the drive members through a selection mechanism such as a Geneva gear in this way, it is possible to easily cope with an increase in the number of operation modes.

As explained in FIGS. 11(a), 11(b) and 11(c), the entire area of the outer circumference of the cam member 34 is utilized for a complete sequence of operations—from unloading to loading and mode selection. And if mechanism elements are to be added, an increase in size of the cam member 34 will be unavoidable when a conventional technique is used. Although this mechanism requires two additional mechanism elements, this invention can prevent the size increase otherwise required.

Next, we will explain arms 90 and 91 that engage with the interior of the engagement groove 35g of the cam member 34, by referring to FIGS. 11(a), 11(b) and 11(c).

The arms 90 and 91 have cam pins 90a and 91a securely attached to their ends that engage with the inner wall of the engagement groove 34g of the cam member 34 or with the in-groove cam 34h. The arms 90, 91 are urged to rotate clockwise or counterclockwise about shafts 94 or 95 secured to the chassis 1 by springs 92, 93 attached to the intermediate portions of the arms 90, 91. The other end of the arm 90 is connected to a rotating mechanism of a tension control arm; and the other end of the arm 91 is connected to a mechanism for varying the tape take-up torque. Explanation of these mechanisms is omitted as they are not directly related to the cam mechanism of this invention.

Figure 12:
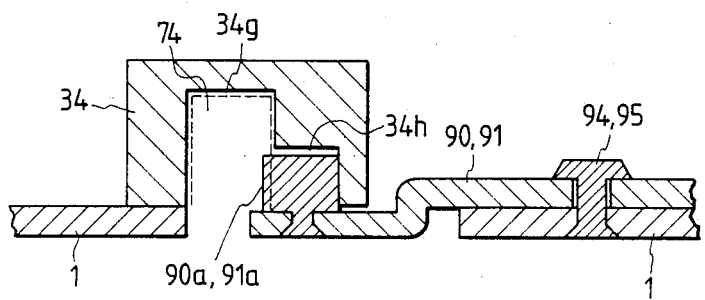
FIG. 12 is a cross-sectional view showing an arm and the cam member.

As shown in the cross-sectional view of FIG. 12, the cam pins 90a, 91a are allowed to project from under the cam member 34 into the engagement groove 34g. The length of the cam pins 90a, 91a is set short so that they can fit and engage the in-groove cam 34h which is formed shallower than the groove 34g. On the other hand, the guide pin 74 of the cam member 34 is inserted deep into the engagement groove 34g so that it will not enter into the in-groove cam 34h, allowing the cam member 34 to rotate smoothly at the radius of the groove 34g at all times.

The arms 90 and 91 are mechanism elements that must perform specified actions during loading (FIG. 11(b) and in the unloaded state (FIG. 11(a)), respectively.

As shown in FIGS. 11(a), 11(b) and 11(c), the cam pin 90a of the arm 90 falls in the in-groove cam 34h only during loading as shown in FIG. 11(b). The cam pin 91a of the arm 91 falls in the in-groove cam 34h only when the tape is unloaded as shown in FIG. 11(a). These cam pins are connected to the corresponding transmission mechanisms to perform specified actions when they fall in the in-groove cam 34h.

The positions of the cam pins 90a, 91a are so selected that the in-groove cams 34h are shifted in the circumferential direction from the cams 34c, 34e formed on the outer circumference. To minimize the size of the cam member 34, the thickness or width of the cam member 34 in the radial direction—from the engagement groove 34g to the outer circumferential surface—is set to the minimum possible value that allows the formation of the stepped recesses for the cams 34c and 34e on the outer circumference. The in-groove cam 34h can produce a specified action if it has the same amount of stepped recess as the cams 34c and 34e on the outer circumference. If these cam recesses on the outer and inner circumference of the cam member 34 are shifted from each other in the circumferential direction, the radial thickness of the cam member 34 need not be increased while maintaining a sufficient strength of the cam member 34. In this way, additional cam patterns can be accommodated without increasing the thickness of the cam member 34.

In this embodiment, two additional mechanism elements are incorporated without increasing the size of the cam member 34.

While in this embodiment the cam member 34 is formed in an arc, it may also be formed into a straight slider or a ring.

When the height of engagement between the cam pin 90a and the cam member 34 in FIG. 12 cannot be made large enough to assure reliability of operation, due to the limiting conditions arising from an effort to seek reduction in the depth of the cam member 34, the depth of the in-groove cam 34h may be set equal to that of the engagement groove 34g to ensure sufficient engagement height between the cam pin 90a and the cam member 34. At the same time the number of the guide pins 74 may be increased so that when one of the guide pins 74 arrives at the in-groove cam position, at least three guide pins are engaged at all times with the curved engagement groove 34g where there is no in-groove cam 34h. Or it is also possible to form the guide pin 74 into a continuous raised rail that engages with the engagement groove 34g except for the engagement portion for the cam pins 90a, 91a.

Figure 13:
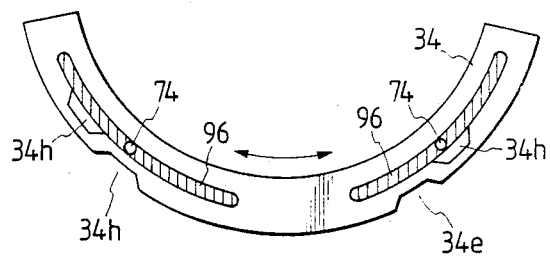
FIG. 13 is a plan view showing another example of the cam member.

Since the cam member 34 of this embodiment has a large rotating angle, the engagement portion is formed as a long continuous groove When, however, the rotating angle is relatively small, the groove may be replaced with two long slots 96, as shown in FIG. 13.

Figure 14A:
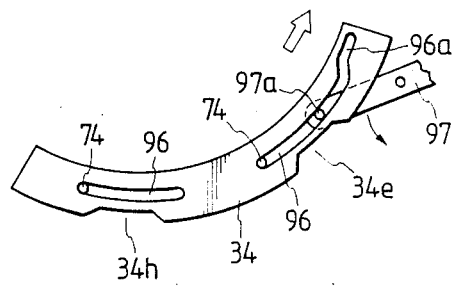
FIGS. 14(a) and 14(b) are plan views showing further examples of the cam member.
Figure 14B:
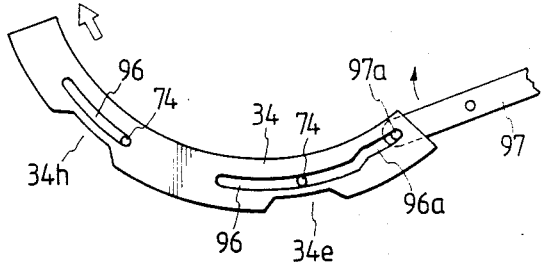

It is also possible to form a long hole cam 96a that connects to the slot 96, as shown in FIGS. 14(a) and 14(b). In this case, an arm 97 that engages with the long hole cam 96a requires no urging spring as used on said arms 90 and 91 by minimizing the play between the long hole cam 96a and the cam pin 97a.

Figure 15:
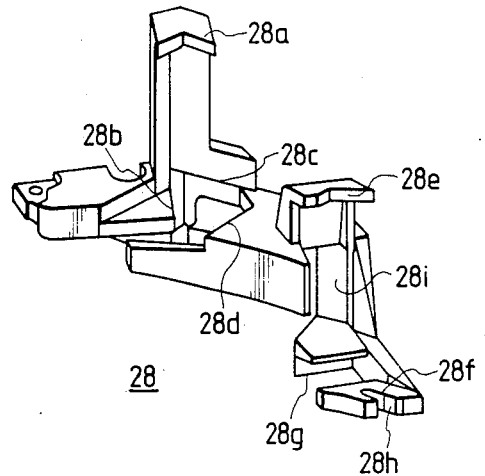
FIG. 15 is a perspective view of a catcher.

FIG. 15 shows a perspective view of a catcher 28, which consists of many integrally formed parts for positioning the tape guides on the tape entrance and exit side of the tape guiding drum 2. For the group of tape guides located on the tape entrance side, the shaft portion at the top of the guide roller 17 shown in FIG. 4 is positioned by a V-groove 28a and the lower part of the guide roller 17 is restricted by a groove 28b to prevent the guide roller 17 from falling in the direction perpendicular to the direction in which it advances. The height of the guide roller 17 is restricted by the upper part of the end of the guide base 26 abutting against a stopper surface 28c. The inclination of the inclined pin 18 is determined by the side of the guide base 26 abutting against the wall 28d. Similar arrangement is made also for the tape guides on the tape exit side. The position and the angle of the guide roller 19 are determined by a V-groove 28e and a U-groove 28f. The height of the guide roller 19 is determined by a stopper surface 28g. The inclination of the inclined pin 20 is restricted by a wall 28h. A notch 28i is provided between the V-groove 28e and the U-groove 28f. In the unloaded condition shown in FIG. 2(b), one end of the cam member 34 and one end of the drive member 31 on the tape exit side pass through the notch 28i. The loading action causes these members to move out of the notch 28i, so that when the loading is complete, the guide roller 19 and the inclined pin 20 are held in the specified positions.

FIG. 16 shows the sequence of motion of the two drive members 31, 33 and the cam member 34, with (a) representing the state of the members for ejection, (e) the state where the loading is complete, and (f) the state where the recording or reproducing mode is activated Each of the members is shown simplified in the form of an arc. As shown in FIG. 16, as the cam member 34 rotates, the drive member 33 on the tape entrance side rotates through almost the same stroke in the opposite direction and the drive member 31 on the tape exit side rotates at almost twice the speed of the cam member 34 in the same direction.

Figure 17A:
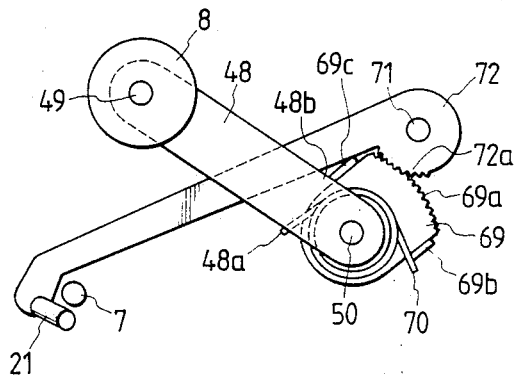
FIGS. 17(a) and 17(b) are plan views showing a mechanism for moving an inclined pin.
Figure 17B:
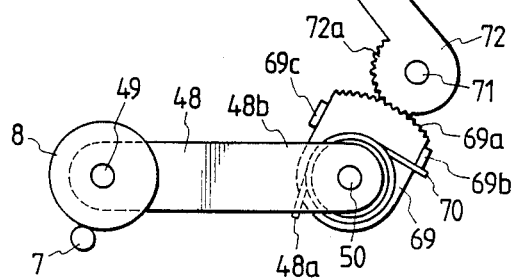

FIG. 17(a) and (b) show a mechanism for moving the inclined pin 21, installed on the tape exit side. FIG. 17(a) represents the condition corresponding to the unloaded condition of FIG. 11(a). A gear 69 which is rotatably supported coaxially with an arm 48 is urged by a spring 70 which has its ends engaged with a bent portion 69b of the gear 69 and with the left side 48a of the arm 48, so that right side 48b of the arm 48 is pressed against a bent portion 69c of the gear 69. As the mode shifts from this condition to the condition of FIG. 17(b) that corresponds to FIG. 11(c) and the arm 48 rotates to press the pinch roller 8 against the capstan 7, an arm 72 which has a gear portion 72a in mesh with the gear portion 69a of the gear 69 is rotated, moving the inclined pin 21 secured at the end of the arm 72 to a specified position where it is held by a catcher 73. After the inclined pin 21 is positioned, the arm 48 further rotates and parts from the bent portion 69c of the gear 69 against the force of the spring 70 as shown in FIG. 17(b), thus giving the inclined pin 21 a sufficient pressing force against the catcher 73. As the inclined pin 21 is driven at the above-mentioned timing, it is loaded from behind the guide base 27. That is, the tracks or loci of motion of the inclined pin 21 and the guide base 27 partly overlap. The position of the arm 42 and the reduction ratio of the driving system for the arm 72 are so set that the guide base 27 will move first and pass through the overlapped portion of the track. Since the action of the arm 72 is controlled by the cam member 34, there is no interference between the inclined pin 21 and the guide base 27.

Figure 18:
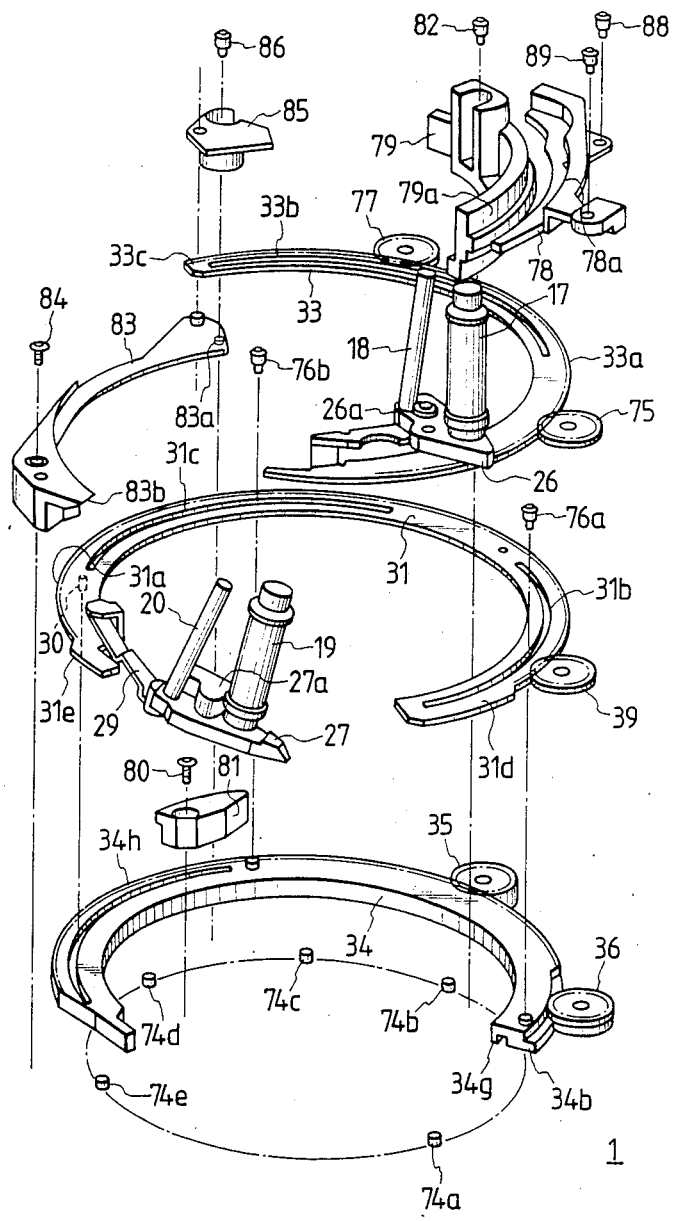
FIG. 18 is an exploded perspective view of the loading mechanism.

As explained above, the mode switching of the loading mechanism is performed mainly by the drive member 33 on the tape entrance side, the drive member 31 on the tape exit side and the cam member 34. FIG. 18 is a perspective view showing the three disassembled arc members The cam member 34 is rotatably guided on the chassis 1 as the guide pins 74a to 74e rigidly erected on the chassis 1 engage with the engagement groove 34g formed along the underside circumference of the cam member 34. The guide pins 74a to 74e are arranged so that at least three of them are always engaged with the groove 34g in the rotation range of the cam member 34 indicated in FIG. 16. The drive member 31 on the tape exit side is rotatably and concentrically mounted on the cam member 34 by the guide pins 76a, 76b and the pin 30 erected on the underside of the drive member 31, with the guide pins 76a, 76b engaging with the slots 31b, 31c of the drive member 31 and with the pin 30 engaging with a slot 34h. The drive member 33, as shown in FIG. 16, has a small rotating angle and has its gear portion 33a on the outer circumference in mesh with the gears 75, 77. The drive member 31 on the tape exit side and the cam member 34 rotate in the same direction through almost 180° or more, as shown in FIG. 16. In FIG. 18, a base for supporting the drive member 31 during its rotation is replaced with the cam member 34. This reduces the angles of the slots 31b, 31c formed in the drive member 31 on the tape exit side to the relative difference in the rotation angle between the drive member 31 and the cam member 34. That is, in the conventional mechanism where a ring that rotates more than 180° is supported on the base, the angle of the slot in the ring must be at least 180°. On the other hand, in this embodiment the slot angle can be reduced, minimizing the problem of the play and strength of the ring.

The guide members 78, 79, 81 are fixed to the chassis 1 by screws 88, 89, 82, 80 to restrict the vertical play of the cam member 34. A holder 83 is interposed between the drive member 33 on the tape entrance side and the drive member 31 on the tape exit side and is fixed to the chassis 1 by a screw 84. A boss 83a integrally formed with the holder 83 engages with the slot 33b in the drive member 33 to hold and guide the drive member 33 on the tape entrance side. A holder 85 is secured to the chassis 1 by a screw 86 to restrict the vertical play of the drive member 33 on the tape entrance side.

The drive member 33 on the tape entrance side which has a smaller rotating angle is guided by the boss 83a of the holder 83 and rotates on the holder 83. The path of motion of the guide base 26 on the tape entrance side is restricted, as shown in FIG. 18, by the engagements between the shaft portion at the lower part of the guide roller 17 and the wall 78a of the guide member 78 and between the end surface 26a of the guide base 26 and the wall 79a of the guide member 79.

Figure 19:
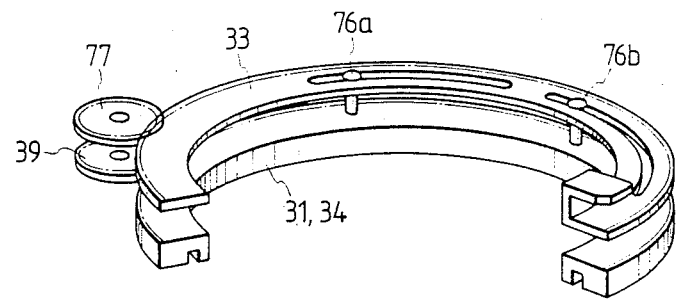
FIGS. 19 and 20 are a perspective view and a cross-sectional view, showing two different examples of the drive member and the cam member.
Figure 20:
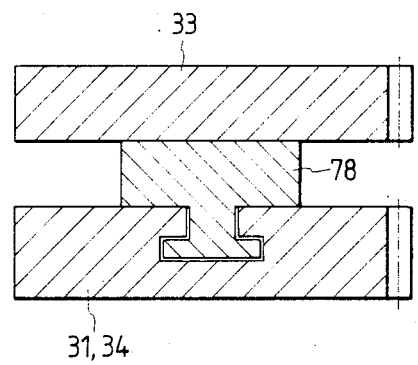

While this embodiment uses three arc sliders (rings) stacked together, it is also possible to use annular rings instead In the loading mechanism which guides two tape guides in one direction, the three stacked rings may be so arranged as to rotate in the same direction. Or, as shown in FIG. 19, the loading mechanism may be formed by two rings, one of which serves as the cam member 34 and also as the tape guide drive member 31. Instead of using slots and pins for retaining and guiding the ring as shown in FIG. 19, it is possible to use a block 78 integral with the ring 33 and a groove.

This invention has the following advantages:

(1) The mechanism according to this invention can accommodate new additional cam patterns while minimizing or preventing an increase in the size of the cam member. This contributes to a reduction in the size and weight of the cam mechanism and therefore the apparatus incorporating it.

(2) Advantages of the loading mechanism include the following:
 (a) Gears that hold and support the rotating rings are always in mesh during a loading operation. This eliminates the meshing problem that occurs at the start of engagement of the gears, thus enhancing reliability of the mechanism.
 (b) Since the members required for holding and supporting the ring can be installed within the width of the ring, the parts arrangement space can be minimized, reducing the size of the apparatus.
 (c) Some of the members required for holding and supporting the ring can be integrally formed with the ring, reducing the number of parts as well as the cost. On the other hand, the conventional mechanism required many gears and rollers.

(3) The tape guide that engages with the rail, T-shaped in cross section, which has a straight portion and a plurality of arc portions, can be stably held without play without using a spring. This helps reduce the size of the mechanism and the number of parts and also helps prevent damage to the tape.

All these advantages will lead to reduction in size and weight of the recording and reproducing apparatus and to a simplified mechanism.

We claim:

1. In a recording and reproducing apparatus, a cam mechanism comprising:
 a movable cam member having a first cam portion formed on an edge of the cam member, a groove formed in a surface of the cam member, and a second cam portion formed on a wall of the groove, a depth of the second cam portion being not greater than a depth of the groove;
 at least one guide member inserted into the groove of the cam member so as to guide the cam member along the at least one guide member during movement of the cam member;
 a fist movable element disposed in contact with the first cam portion so as to move and follow a shape of the first cam portion during movement of the cam member; and
 a second movable element disposed in contact with the second cam portion so as to move and follow a shape of the second cam portion during movement of the cam member.

2. A cam mechanism according to claim 1, further comprising driving means for driving the cam member to move along the at least one guide member.

3. In a recording and reproducing apparatus having a chassis and a rotatable drum mounted on the chassis, a tape loading mechanism comprising:
 a first slidable member having a groove formed therein;
 at least first one guide member mounted on the chassis and inserted into the groove of the first slidable member so as to guide the first slidable member around the rotatable drum during sliding of the first slidable member;

a second slidable member having a slot formed therein; and at least one second guide member mounted on the first slidable member and inserted into the slot of the second slidable member so as to guide the second slidable member around the rotatable drum during sliding of the second slidable member.

4. A tape loading mechanism according to claim 3, further comprising:

first driving means for driving the first slidable member to slide around the rotatable drum; and second driving means for driving the second slidable member to slide around the rotatable drum.

5. A tape loading mechanism according to claim 4, wherein the first driving means and the second driving means are adapted for respectively driving the first slidable member and the second slidable member independently of each other.

6. In a recording and reproducing apparatus, a tape loading mechanism comprising:

a guide member having curved portions with different curvatures; and movable tape guide means having a clamp portion for holding the tape guide means on the guide member so as to guide the tape guide means along the guide member during movement of the tape guide means, the clamp portion being provided with a plurality of projections having an arcuate cross section disposed in contact with the guide member so as to hold the guide member therebetween.

7. A tape loading mechanism according to claim 6, wherein the clamp portion is provided with two pairs of projections, the projections in each pair of projections being disposed to opposed each other.

8. In a recording and reproducing apparatus having a chassis and a rotatable drum mounted on the chassis, a tape loading mechanism comprising:

a slidable cam member having a first cam portion formed on an edge of the cam member, a groove formed in a surface of the cam member, and a second cam portion formed on a wall of the groove, a depth of the second cam portion being not greater than a depth of the groove;

at least one first guide member mounted on the chassis and inserted into the groove of the cam member so as to guide the cam member around the rotatable drum during sliding of the cam member;

a first movable element disposed in contact with the first cam portion so as to move and follow a shape of the first cam portion during sliding of the cam member;

a second movable element disposed in contact with the second cam portion so as to move and follow a shape of the second cam portion during sliding of the cam member;

a slidable member having a slot formed therein;

at least one second guide member mounted on the slidable cam member and inserted into the slot of the slidable member so as to guide the slidable member around the rotatable drum during sliding of the slidable member;

a third guide member having curved portions with different curvatures; and movable tape guide means having a clamp portion for holding the tape guide means on the third guide member so as to guide the tape guide means along the third guide member during movement of the tape guide means, the clamp portion being provided with a plurality of projections having an arcuate cross section disposed in contact with the third guide member so as to hold the third guide member therebetween.

* * * * *